United States Patent
Choi et al.

(10) Patent No.: US 12,224,411 B2
(45) Date of Patent: Feb. 11, 2025

(54) METHOD AND SYSTEM FOR EVALUATING INSULATION AND LITHIUM ION CONDUCTIVITY CHARACTERISTICS OF SEPARATOR FOR ELECTROCHEMICAL DEVICE

(71) Applicant: LG ENERGY SOLUTION, LTD., Seoul (KR)

(72) Inventors: Soon Ju Choi, Daejeon (KR); Eun Ju Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 622 days.

(21) Appl. No.: 17/626,715

(22) PCT Filed: Oct. 6, 2020

(86) PCT No.: PCT/KR2020/013599
§ 371 (c)(1),
(2) Date: Jan. 12, 2022

(87) PCT Pub. No.: WO2021/075778
PCT Pub. Date: Apr. 22, 2021

(65) Prior Publication Data
US 2022/0255152 A1    Aug. 11, 2022

(30) Foreign Application Priority Data
Oct. 14, 2019 (KR) .................. 10-2019-0126783

(51) Int. Cl.
*H01M 10/48* (2006.01)
*H01M 10/04* (2006.01)
(Continued)

(52) U.S. Cl.
CPC ....... *H01M 10/48* (2013.01); *H01M 10/0481* (2013.01); *H01M 10/4285* (2013.01);
(Continued)

(58) Field of Classification Search
CPC ...................................................... H01M 10/48
(Continued)

(56) References Cited

U.S. PATENT DOCUMENTS

| | | | | |
|---|---|---|---|---|
| 2009/0261835 | A1* | 10/2009 | Iwanaga | H01M 6/50 324/426 |
| 2011/0191043 | A1* | 8/2011 | Lee | G01R 31/1263 702/65 |

(Continued)

FOREIGN PATENT DOCUMENTS

| | | |
|---|---|---|
| CN | 101334371 A | 12/2008 |
| CN | 106370930 A | 2/2017 |

(Continued)

OTHER PUBLICATIONS

Extended European Search Report issued in European Application No. 20876314.4 dated Jul. 13, 2022.
(Continued)

*Primary Examiner* — Jerry D Robbins
(74) *Attorney, Agent, or Firm* — MORGAN, LEWIS & BOCKIUS LLP (57) ABSTRACT

The present invention relates to a method and system for evaluating insulation and lithium ion conductivity characteristics of a separator for an electrochemical device, in which insulation and lithium ion conductivity characteristics are evaluated while a separator-containing measurement object to be tested and an electrochemical device are made to face each other, and thus, the insulation and lithium ion conductivity characteristics of the separator can be evaluated by reflecting temperature and pressure changes and the like according to the actual operation state of the electrochemical device.

15 Claims, 4 Drawing Sheets

(51) Int. Cl.
  *H01M 10/42* (2006.01)
  *H01M 10/615* (2014.01)
  *H01M 10/66* (2014.01)
  *H01M 50/431* (2021.01)
  *H01M 50/46* (2021.01)
  *H01M 50/497* (2021.01)
  *H01M 10/0525* (2010.01)
  *H01M 50/105* (2021.01)

(52) U.S. Cl.
  CPC ......... *H01M 10/615* (2015.04); *H01M 10/66* (2015.04); *H01M 50/431* (2021.01); *H01M 50/46* (2021.01); *H01M 50/497* (2021.01); *H01M 10/0525* (2013.01); *H01M 50/105* (2021.01)

(58) Field of Classification Search
  USPC ......................................................... 320/134
  See application file for complete search history.

(56) References Cited

U.S. PATENT DOCUMENTS

| | | | |
|---|---|---|---|
| 2016/0365559 | A1 | 12/2016 | Yoshimura et al. |
| 2018/0056809 | A1 | 3/2018 | Uchida |
| 2018/0134926 | A1* | 5/2018 | Lei .......................... B32B 5/22 |
| 2018/0254514 | A1* | 9/2018 | Li ........................ H01M 50/562 |

FOREIGN PATENT DOCUMENTS

| | | |
|---|---|---|
| CN | 107783054 A | 3/2018 |
| CN | 108110342 A | 6/2018 |
| EP | 3 493 320 A1 | 6/2019 |
| IN | 109709196 A | 5/2019 |
| JP | 2008-027712 A | 2/2008 |
| JP | 2009-009812 A | 1/2009 |
| JP | 2009-117230 A | 5/2009 |
| JP | 2012-069456 A | 4/2012 |
| JP | 2013-089340 A | 5/2013 |
| JP | 2014-003071 A | 1/2014 |
| JP | 5605344 B2 | 10/2014 |
| KR | 10-0591441 B1 | 6/2006 |
| KR | 10-2007-0100644 A | 10/2007 |
| KR | 10-2012-0009661 A | 2/2012 |
| KR | 10-2013-0123762 A | 11/2013 |
| KR | 10-2014-0003388 A | 1/2014 |
| KR | 10-2016-0034018 A | 3/2016 |
| KR | 10-2016-0102331 A | 8/2016 |
| KR | 10-2018-0104085 A | 9/2018 |
| KR | 10-2019-0006920 A | 1/2019 |
| KR | 10-1980844 B1 | 5/2019 |
| KR | 10-2019-0100736 A | 8/2019 |
| KR | 10-2019-0113682 A | 10/2019 |

OTHER PUBLICATIONS

Examination Report issued in corresponding Indian Patent Application No. 202217000966 dated Jun. 13, 2022.
Office action issued on Sep. 29, 2023, by the Chinese Patent Office corresponding to Chinese Patent Application No. 202080050732.5.
International Search Report (with partial translation) and Written Opinion dated Jan. 15, 2021 issued in corresponding International Patent Application No. PCT/KR2020/013599.
Office Action dated Oct. 18, 2024 issued in Korean Patent Application No. 10-2019-0126783.

* cited by examiner

M ETHOD AND SYSTEM FOR EVALUATING
INSULATION AND LITHIUM ION
CONDUCTIVITY CHARACTERISTICS OF
SEPARATOR FOR ELECTROCHEMICAL
DEVICE

TECHNICAL FIELD

The present invention relates to a method and system for evaluating insulation and lithium ion conductivity characteristics of a separator for an electrochemical device reflecting the actual operating state of the electrochemical device.

This application claims the benefit of priority based on Korean Patent Application No. 10-2019-0126783, filed on Oct. 14, 2019, and the entire contents of the Korean patent application are incorporated herein by reference.

BACKGROUND ART

As the price of energy sources increases due to the depletion of fossil fuels, and interest in environmental pollution is amplified, the demand for eco-friendly alternative energy sources is increasing. In particular, as technology development and demand for mobile devices increase, the demand for secondary batteries as energy sources is rapidly increasing. Regarding the shape of the secondary battery, there is a high demand for a pouch-type secondary battery in that it can be applied to mobile products such as mobile phones with a small thickness.

Such a pouch-type secondary battery has a structure in which an electrode assembly is embedded in a pouch-type battery case formed of an aluminum laminate sheet. Specifically, in the pouch-type secondary battery, a stack-type or stack-folding electrode assembly in which a positive electrode, a separator, and a negative electrode are sequentially stacked is accommodated in the battery case. Each positive electrode and negative electrode are electrically connected by electrode tabs, and electrode leads that are drawn out are connected to the electrode tabs. After the electrode assembly, to which the electrode tab and the electrode lead are connected, is accommodated in a pouch-type battery case, an electrolyte is injected, and the battery case is sealed with part of the electrode lead exposed to the outside, to thereby assemble a secondary battery.

Conventionally, in order to evaluate the characteristics of such a separator, insulation and lithium ion conductivity properties of the separator itself were measured. Specifically, a separator was pinched between the upper jig and the lower jig, and a voltage was applied between the two jigs to thereby measure a voltage when a current greater than a reference value flowed through the separator, as the dielectric breakdown voltage.

However, with the above-described method, only the characteristics of the separator itself can be measured, and insulation and lithium ion conductivity characteristics that reflect the charge/discharge characteristics of the electrode assembly in real time cannot be measured. In the electrochemical device including the electrode assembly, changes in volume and temperature are induced during charging and discharging. These changes in volume and temperature act as variables that affect the insulation and lithium ion conductivity properties of the separator. Accordingly, there is a need for a technology capable of confirming the insulation and lithium ion conductivity characteristics of the separator reflecting the actual use conditions of the electrochemical device.

DISCLOSURE

Technical Problem

The present invention has been invented to solve the above problems, and an object of the present invention is to provide a method and system for evaluating the characteristics of insulation and lithium ion conductivity of a separator for an electrochemical device reflecting the actual operating state of the electrochemical device.

Technical Solution

A method for evaluating insulation and lithium ion conductivity characteristics of a separator for an electrochemical device according to the present invention includes: a step of repeatedly performing charging and discharging of the electrochemical device; and a step of measuring an electrical resistance of an object to be measured while performing charging and discharging of the electrochemical device, in a state that the object to be measured including a positive electrode, a negative electrode, and a separator interposed between the positive electrode and the negative electrode; and the electrochemical device positioned to face the object to be measured, are pinched between an upper jig and a lower jig.

In one example, the object to be measured includes: an electrode assembly including a positive electrode, a negative electrode, and a separator interposed between the positive electrode and the negative electrode; and a pouch-type battery case in which the electrode assembly is accommodated.

In further another example, the electrochemical device repeatedly performs charging and discharging, and the object to be measured does not perform charging and discharging while performing the method of evaluating the insulation and lithium ion conductivity characteristics of the separator for the electrochemical device.

In a specific example, the object to be measured and the electrochemical device have a same positive electrode and negative electrode structure and composition.

For example, the separator of the electrochemical device has a structure including an inorganic layer formed on one or both sides of a separator sheet specimen, and the separator of the object to be measured is formed as a separator sheet specimen, and has a structure in which no separate inorganic layer is formed on both sides of the specimen.

In one example, the upper and lower jigs fix the state in which the object to be measured and the electrochemical device face each other.

In further another example, the upper and lower jigs pressurize the state in which the object to be measured and the electrochemical device face each other.

In further another example, the upper and lower jigs heat any one or more of the object to be measured and the electrochemical device while the evaluation is in progress.

For example, the separator is a separator for a lithium secondary battery.

In addition, the present invention provides a system for evaluating insulation and lithium ion conductivity characteristics of a separator for an electrochemical device. In one example, a system for evaluating insulation and lithium ion conductivity characteristics of a separator for an electrochemical device includes: jig units configured to fix or press an object to be measured; an electrochemical device configured to repeatedly perform charging and discharging while located between the jig units; the object to be measured configured to be positioned in a state facing the electrochemical device between the jig units; and a measuring unit configured to measure an electrical resistance of the object to be measured.

In a specific example, the object to be measured includes: an electrode assembly including a positive electrode, a negative electrode, and a separator interposed between the positive electrode and the negative electrode; and a pouch-type battery case in which the electrode assembly is accommodated.

In further another example, at least one of the upper and lower jigs has a structure on which a heating member is mounted.

In a specific example, the system for evaluating insulation and lithium ion conductivity characteristics of the separator for the electrochemical device further includes a recording unit configured to record an electrical resistance value through the measuring unit while the evaluation is in progress.

In further another example, the jig unit further includes any one or more of a temperature sensor configured to measure a temperature of the object to be measured and a pressure sensor configured to measure a pressure of the object to be measured.

For example, the jig unit further includes at least one of a temperature sensor configured to measure a temperature of the object to be measured and a pressure sensor configured to measure a pressure of the object to be measured, and the recording unit records an electrical resistance value through the measuring unit and a value measured through one or more of a temperature sensor and a pressure sensor for measuring a pressure of the object to be measured, while the evaluation is in progress.

Advantageous Effects

According to a method for evaluating insulation and lithium ion conductivity characteristics of a separator for an electrochemical device according to the present invention, insulation and lithium ion conductivity characteristics of the separator can be evaluated by reflecting changes in temperature and pressure according to the actual operating state of the electrochemical device.

DETAILED DESCRIPTION OF THE PREFERRED EMBODIMENTS

Hereinafter, the present invention will be described in detail with reference to the drawings. The terms and words used in the present specification and claims should not be construed as limited to ordinary or dictionary terms and the inventor may properly define the concept of the terms in order to best describe its invention. The terms and words should be construed as meaning and concept consistent with the technical idea of the present invention. In the present invention, a "method for evaluating insulation and lithium ion conductivity characteristics of a separator for an electrochemical device" or a "system" is disclosed, which means measuring the electrical resistance of a separator impregnated with an electrolyte solution. The charge mobility of the electrolyte solution is changed depending on the permeability or tortuosity of the separator. Therefore, by measuring the electrical resistance of the separator impregnated with the electrolyte solution, changes in the shape or characteristics of the separator are checked.

In the present invention, the terms "upper jig" and "lower jig" include a case that two arms are positioned in a direction facing each other, and thus, a measurement object or the like is fixed or pressed. In the present invention, for convenience of explanation, it is described as "upper jig" and "lower jig", and includes a case where two arms are composed of a "right jig" and a "left jig" positioned in a direction facing each other in the left and right direction. Therefore, they can be replaced with "first jig" and "second jig" according to the position or direction of the jig.

The present invention provides a method for evaluating insulation and lithium ion conductivity characteristics of a separator for an electrochemical device. Specifically, the evaluation method includes: a step of repeatedly performing charging and discharging of the electrochemical device; and a step of measuring an electrical resistance of an object to be measured while performing charging and discharging of the electrochemical device, in a state that the object to be measured including a positive electrode, a negative electrode, and a separator interposed between the positive electrode and the negative electrode; and the electrochemical device positioned to face the object to be measured, are pinched between an upper jig and a lower jig.

In the method of evaluating the insulation and lithium ion conductivity characteristics of the separator for an electrochemical device according to the present invention, the electrical resistance of the separator is measured by reflecting the physical properties of the separator, such as permeability and tortuosity. When the electrochemical device performs charging and discharging in the module or jig, the pressurization state according to the swelling changes. The pressure applied to the electrochemical device is transmitted to the separator, and this pressure change affects the physical properties of the separator. In addition, the electrochemical device generates heat during the charging and discharging process, and this temperature increase also changes the electrical characteristics of the separator.

In the present invention, insulation and lithium ion conductivity characteristics of a separator are evaluated in a state in which an object to be measured and an electrochemical device are faced in a jig. During the evaluation, the electrochemical device repeats charging and discharging. In the process of charging and discharging the electrochemical device, volume expansion or temperature rise of the device is performed, and the effect is transmitted to the object to be measured. In addition, when the temperature of the battery increases during the charging and discharging process, heat is transferred to the object to be measured. Through this, the method of evaluating the insulation and lithium ion conductivity characteristics of the separator for an electrochemical device according to the present invention has an advantage that the evaluation is performed in a state in which an environment that satisfies the actual use conditions of the electrochemical device is given to the object to be measured.

Insulation and lithium ion conductivity characteristics of the object to be measured including the separator may be measured using, for example, an electrochemical impedance spectroscopy (EIS) in a high frequency region.

The object to be measured is prepared by laminating a positive electrode, a negative electrode, and a separator interposed between the positive electrode and the negative electrode, and injecting an electrolyte solution while inserting the separator into the case. In one embodiment, the object to be measured includes an electrode assembly including a positive electrode, a negative electrode, and a separator interposed between the positive electrode and the negative electrode; and a pouch-type battery case in which the electrode assembly is accommodated. Furthermore, the object to be measured may be assembled in the same structure and shape as the electrochemical device facing the object to be measured. For example, the object to be measured may include an electrode assembly including a positive electrode, a negative electrode, and a separator interposed between the positive electrode and the negative electrode; and a pouch-type battery case in which the electrode assembly is accommodated, and an electrolyte solution is injected into the battery case.

In another embodiment, while performing the method of evaluating the insulation and lithium ion conductivity characteristics of the separator for the electrochemical device, the electrochemical device repeatedly performs charging and discharging, and the object to be measured does not perform charging and discharging. That is, the electrochemical device repeatedly performs charging and discharging to form actual use conditions for the electrochemical device, and the object to be measured performs insulation for the separator and evaluation of lithium ion conductivity characteristics. When charging and discharging the object to be measured is performed, an electrochemical shock may be applied to the object to be measured during the charging and discharging process. This electrochemical impact acts as another variable when evaluating the insulation and lithium ion conductivity characteristics of the separator, and changes in the state of the electrode active material layer or electrolyte solution affect the evaluation result.

In one embodiment, the object to be measured and the electrochemical device have the same structure and composition as a positive electrode and a negative electrode. That is, in a state in which two identical electrochemical devices are prepared, one electrochemical device serves to implement actual use conditions, and the other electrochemical device becomes an object to be measured that evaluates the insulation and lithium ion conductivity characteristics of the separator.

In further another example, the separator of the electrochemical device has a structure including an inorganic layer formed on one or both sides of a separator sheet specimen, and the separator of the object to be measured is formed as a separator sheet specimen, and has a structure in which no separate inorganic layer is formed on both sides of the specimen. Depending on the type of separator, inorganic layers may be formed on one or both sides of the separator fabric in order to improve the properties of the separator. In this case, the inorganic layer formed on the surface of the separator may impart insulating properties to the separator, and the insulation properties of the inorganic layer, not the insulation properties of the separator fabric itself, may be reflected in the evaluation results. Therefore, when the separator to be evaluated includes an inorganic layer on one or both sides of the separator fabric specimen, it is recommended to remove the inorganic layer from the separator fabric specimen or use a separator fabric with no inorganic layer formed thereon.

In the present invention, the evaluation is performed while the object to be measured and the electrochemical device are placed between the upper and lower jigs. The role of the upper and lower jigs is to fix the positions of the object to be measured and the electrochemical device, and to support the pressure change according to the volume change, which is generated when the electrochemical device is changed in volume during the charging and discharging process, to be transmitted to the object to be measured. Accordingly, the upper and lower jigs serve to fix a state in which the object to be measured and the electrochemical device face each other.

In yet another embodiment, the upper and lower jigs pressurize a state in which the object to be measured and the electrochemical device face each other. The purpose of pressing the object to be measured using the upper and lower jigs is to shorten the evaluation time by forming harsh conditions for the object to be measured.

In yet another embodiment, the upper and lower jigs heat one or more among the object to be measured and the electrochemical device while the evaluation is in progress. The purpose of heating the object to be measured using the upper and lower jigs is to shorten the evaluation time by forming harsh conditions for the object to be measured.

The method for evaluating the insulation and lithium ion conductivity characteristics of a separator according to the present invention can be applied to various types of separators for electrochemical devices. For example, the separator is a separator for a lithium secondary battery.

In addition, the present invention provides a system for evaluating insulation and lithium ion conductivity characteristics of a separator for an electrochemical device. The evaluation system is for applying the method of evaluating the insulation and lithium ion conductivity characteristics of the separator for an electrochemical device described above, and overlapping descriptions will be omitted.

In one example, the evaluation system includes: jig units configured to fix or press an object to be measured; an electrochemical device configured to repeatedly perform charging and discharging while located between the jig units; the object to be measured configured to be positioned in a state facing the electrochemical device between the jig units; and a measuring unit configured to measure an electrical resistance of the object to be measured.

In the system for evaluating the insulation and lithium ion conductivity characteristics of the separator for an electrochemical device according to the present invention, the evaluation is performed in a state in which an environment that meets the actual conditions of use of the electrochemical device is given to the object to be measured, and if necessary, it is possible to shorten the evaluation time by pressing the object to be measured through the jig unit.

In one embodiment, an object to be measured of the evaluation system according to the present invention includes an electrode assembly including a positive electrode, a negative electrode, and a separator interposed between the positive electrode and the negative electrode; and a pouch-type battery case in which the electrode assembly is accommodated.

In another embodiment, at least one of the upper and lower jigs has a structure in which a heating member is mounted. Through the heating member, the evaluation time of the evaluation system according to the present invention can be shortened.

In yet another embodiment, the evaluation system according to the present invention further includes a recording unit for recording an electrical resistance value through the measuring unit while the evaluation is in progress.

In one embodiment, the jig unit further includes at least one of a temperature sensor for measuring a temperature of the object to be measured and a pressure sensor for measuring a pressure of the object to be measured.

For example, the jig unit further includes any one or more of a temperature sensor configured to measure a temperature of the object to be measured and a pressure sensor configured to measure a pressure of the object to be measured, and the recording unit records an electrical resistance value through the measuring unit and a value measured through one or more of a temperature sensor and a pressure sensor for measuring a pressure of the object to be measured, while the evaluation is in progress.

The method and system for evaluating the insulation and lithium ion conductivity characteristics of the separator according to the present invention can be applied to various types of separators for electrochemical devices. For example, the separator is a separator for a lithium secondary battery.

The lithium secondary battery includes, for example, an electrode assembly including a positive electrode, a negative electrode, and a separator interposed between the positive electrode and the negative electrode; a non-aqueous electrolyte impregnating the electrode assembly; and a battery case containing the electrode assembly and the non-aqueous electrolyte.

The positive electrode has a structure in which a positive electrode active material layer is stacked on one or both sides of a positive electrode current collector. The positive electrode active materials may each independently be a lithium-containing oxide, and may be the same or different. A lithium-containing transition metal oxide may be used as the lithium-containing oxide. In one example, the positive electrode active material layer includes a positive electrode active material, a conductive material, and a binder polymer, and if necessary, may further include a positive electrode additive commonly used in the art.

The current collector used for the positive electrode is a metal having high conductivity, and any metal which the positive electrode active material slurry may be easily attached to and which is not reactive in the voltage range of the electrochemical device can be used. Specifically, non-limiting examples of the current collector for the positive electrode include aluminum, nickel, or a foil manufactured by a combination thereof.

The negative electrode may include a carbon material, lithium metal, silicon or tin as a negative electrode active material. When a carbon material is used as the negative electrode active material, both low crystalline carbon and high crystalline carbon may be used. Representative examples of low crystalline carbon include soft carbon and hard carbon are typical. Representative examples of high crystalline carbon include natural graphite, kish graphite, pyrolytic carbon, mesophase pitch based carbon fiber, mesocarbon microbeads, mesophase pitches, and high-temperature calcined carbons such as petroleum or coal tar pitch derived cokes.

Non-limiting examples of the current collector used for the negative electrode include copper, gold, nickel, or a foil manufactured by a copper alloy or a combination thereof. In addition, the current collector may be used by stacking substrates made of the above materials.

In addition, the negative electrode may include a conductive material and a binder commonly used in the art.

The separator may be made of any porous substrate used in a lithium secondary battery, and for example, a polyolefin-based porous membrane or a nonwoven fabric may be used, but the present invention is not particularly limited thereto.

Examples of the polyolefin-based porous membrane include polyethylene such as high density polyethylene, linear low density polyethylene, low density polyethylene, ultra high molecular weight polyethylene, and a membrane in which polyolefin-based polymers, such as polypropylene, polybutylene, and polypentene, are each formed alone or in a mixture thereof.

Hereinafter, the present invention will be described in more detail through examples.

Figure 1:
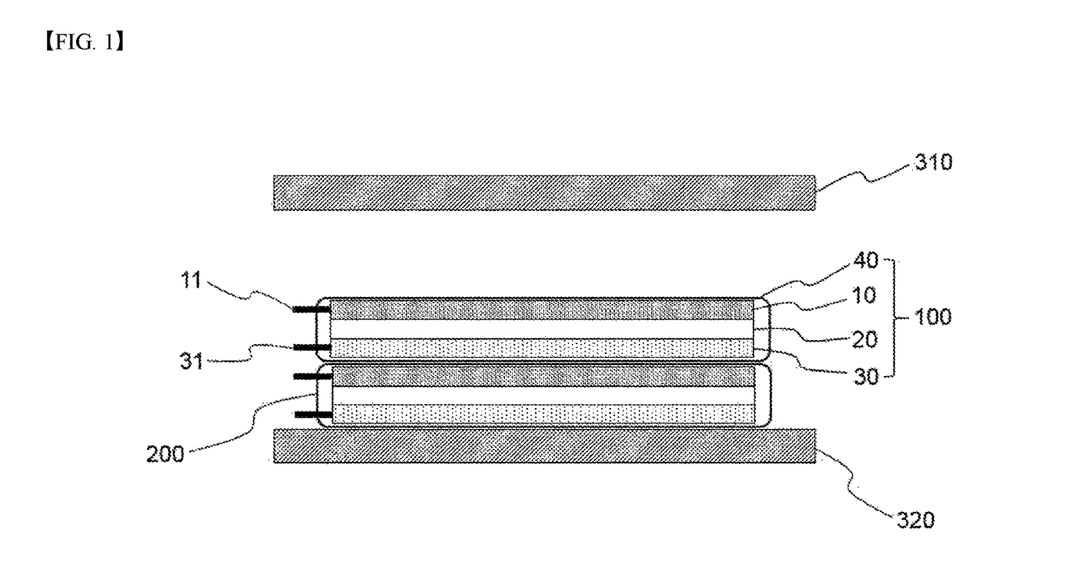
FIG. 1 is a schematic diagram showing a state in which an evaluation object is placed between upper and lower jigs before performing an evaluation according to a method for evaluating insulation and lithium ion conductivity characteristics of a separator for an electrochemical device according to an exemplary embodiment of the present invention.

FIG. 1 is a schematic diagram showing a state in which an evaluation object is placed between upper and lower jigs before performing an evaluation according to a method for evaluating insulation and lithium ion conductivity characteristics of a separator for an electrochemical device according to an exemplary embodiment of the present invention. Referring to FIG. 1, an object to be measured 100 and an electrochemical device 200 are positioned between the upper jig 310 and the lower jig 320 so as to face each other. The object to be measured 100 has an electrode assembly, in which a positive electrode 10, a separator 20, and a negative electrode 30 are sequentially stacked, in a battery case 40. In addition, a positive electrode tab 11 and a negative electrode tab 31 electrically connected to the positive electrode 10 and the negative electrode 30 of the object to be measured 100 are exposed to the outside of the battery case 40, respectively.

Figure 2:
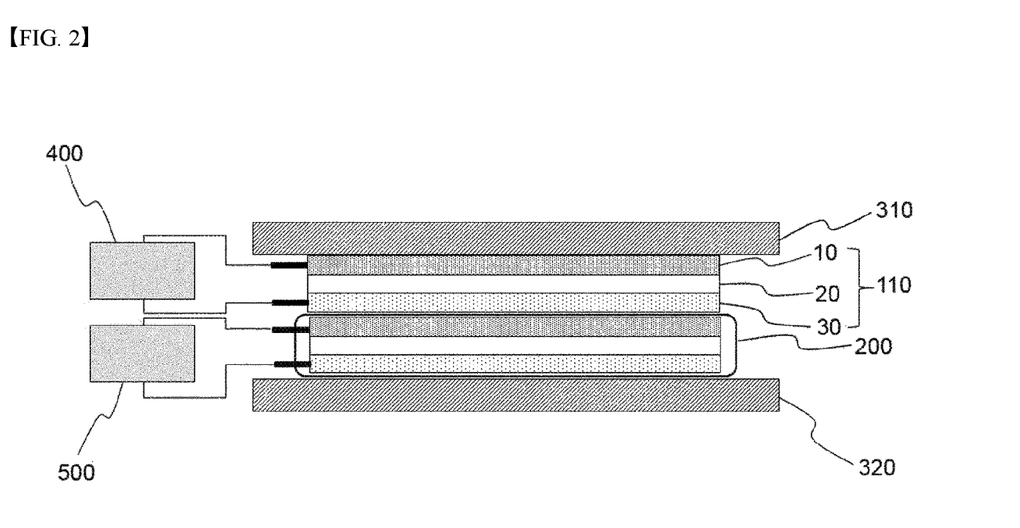
FIGS. 2 to 4 are schematic diagrams each showing a method or system for evaluating insulation and lithium ion conductivity characteristics of a separator for an electrochemical device according to an exemplary embodiment of the present invention.
Figure 3:
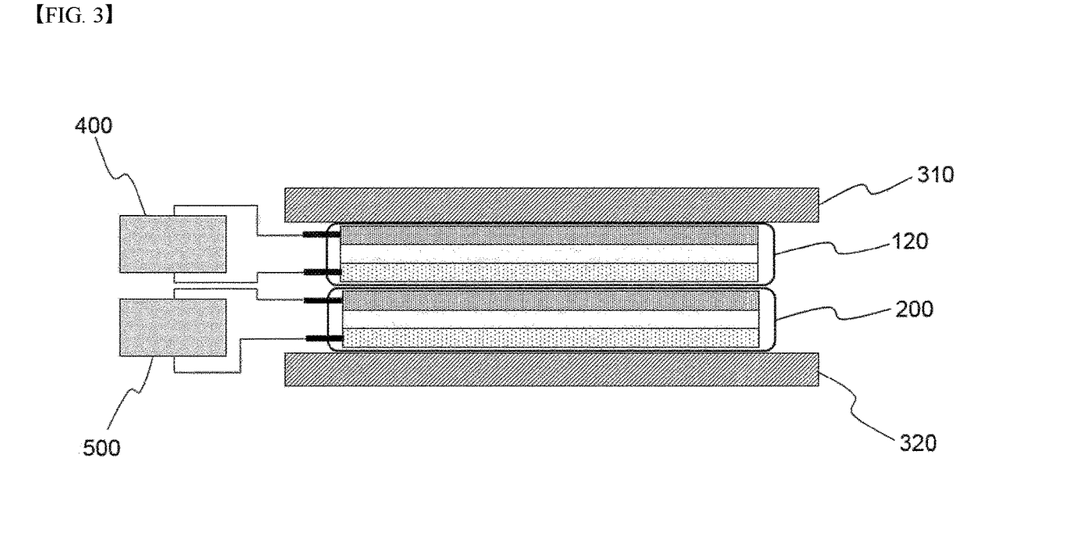
Figure 4:
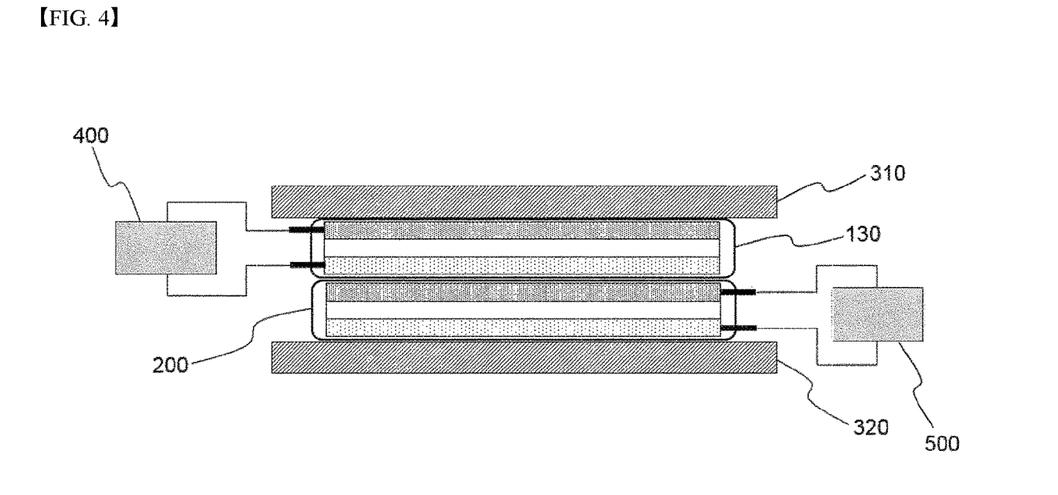

FIGS. 2 to 4 are schematic diagrams each showing a method or system for evaluating insulation and lithium ion conductivity characteristics of a separator for an electrochemical device according to an exemplary embodiment of the present invention. In the following, each case will be described.

Example 1

FIG. 2 is schematic diagram showing a method or system for evaluating insulation and lithium ion conductivity characteristics of a separator for an electrochemical device according to an exemplary embodiment of the present invention. Referring to FIG. 2, while the object to be measured 110 and the electrochemical device 200 face each other, they are positioned between the upper jig 310 and the lower jig 320. The object to be measured 110 has a structure in which a positive electrode 10, a separator 20, and a negative electrode 30 are sequentially stacked. In addition, the positive electrode tab 11 and the negative electrode tab 31 respectively and electrically connected to the positive electrode 10 and the negative electrode 30 of the object to be measured 100 are protruding. A measuring instrument 400 measures the insulation and lithium ion conductivity characteristics of the object to be measured 110 while being connected to the positive electrode tab 11 and the negative electrode tab 31. The measuring instrument 400 uses an electrochemical impedance spectroscopy (EIS) in a high frequency region.

In addition, an electrochemical device 200 is positioned under the object to be measured 110. The electrochemical device 200 repeats the charging/discharging process through the connected power supply 500. Changes in volume and temperature caused while the electrochemical device 200 performs charging and discharging are transmitted to the object to be measured 110 facing each other. The power source 500 performs charging of the electrochemical device 200, but the discharge of the electrochemical device 200 is also induced by including a resistor as necessary.

Example 2

FIG. 3 is schematic diagram showing a method or system for evaluating insulation and lithium ion conductivity characteristics of a separator for an electrochemical device according to an exemplary embodiment of the present invention. Referring to FIG. 3, while the object to be measured 120 and the electrochemical device 200 face each other, they are positioned between the upper jig 310 and the lower jig 320. The object to be measured 100 and the electrochemical device 200 have an electrode assembly, in which a positive electrode 10, a separator 20, and a negative electrode 30 are sequentially stacked, in a battery case 40.

A measuring instrument 400 measures the insulation and lithium ion conductivity characteristics of the object to be measured 120 while being connected to the positive electrode tab and the negative electrode tab of the object to be measured 120. The measuring instrument 400 uses an electrochemical impedance spectroscopy (EIS) in a high frequency region. Further, the electrochemical device 200 repeats the charging/discharging process through the connected power supply 500.

Example 3

FIG. 4 is schematic diagram showing a method or system for evaluating insulation and lithium ion conductivity characteristics of a separator for an electrochemical device according to an exemplary embodiment of the present invention. Referring to FIG. 4, while an object to be measured 130 and the electrochemical device 200 face each other, they are positioned between the upper jig 310 and the lower jig 320. The object to be measured 130 and the electrochemical device 200 have an electrode assembly, in which a positive electrode 10, a separator 20, and a negative electrode 30 are sequentially stacked, in a battery case 40.

The object to be measured 130 and the electrochemical device 200 are positioned so that the positive electrode tab and the negative electrode tab protrude in different directions. Through this, a space for connection between the object to be measured 130 and the measuring instrument 400 and connection between the electrochemical device 200 and the power source 500 was secured.

Specifically, the measuring instrument 400 measures the insulation and lithium ion conductivity characteristics of the object to be measured 130 while being connected to the positive electrode tab and the negative electrode tab of the object to be measured 130. The measuring instrument 400 uses an electrochemical impedance spectroscopy (EIS) in a high frequency region. Further, the electrochemical device 200 repeats the charging/discharging process through the connected power supply 500.

In the above, the present invention has been described in more detail through the drawings and examples. However, the embodiments described in the specification and the configurations described in the drawings are only the most preferred embodiments of the present invention, and do not represent all of the technical ideas of the present invention. It is to be understood that there may be various equivalents and variations in place of them at the time of filing the present application.

DESCRIPTION OF REFERENCE NUMERALS

10: positive electrode
11: positive electrode tab
20: separator
30: negative electrode
31: negative electrode tab
40: battery case
100, 110, 120, 130: object to be measured
200: electrochemical device
310: upper jig
320: lower jig
400: measuring instrument
500: power

The invention claimed is:

1. A method for evaluating insulation and lithium ion conductivity characteristics of a separator for an electrochemical device, comprising:
    repeatedly performing charging and discharging of an another electrochemical device; and
    measuring an electrical resistance of an object to be measured while the repeatedly performing charging and discharging of the another electrochemical device, in a state that the object to be measured including a positive electrode, a negative electrode, and the separator interposed between the positive electrode and the negative electrode; and the electrochemical device positioned to face the object to be measured, are pinched between an upper jig and a lower jig.

2. The method of claim 1, wherein the object to be measured includes:
    an electrode assembly including the positive electrode, the negative electrode, and the separator interposed between the positive electrode and the negative electrode; and
    a pouch-type battery case in which the electrode assembly is accommodated.

3. The method of claim 1, wherein the another electrochemical device repeatedly performs charging and discharging, and the object to be measured does not perform charging and discharging while the repeatedly performing charging and discharging of the electrochemical device.

4. The method of claim 1, wherein the another electrochemical device includes an another positive electrode, an another negative electrode, and an another separator interposed between the another positive electrode and the another negative electrode, and the object to be measured and the another electrochemical device have a same structure and composition of the positive electrodes and the negative electrodes as each other.

5. The method of claim 1, wherein
    the separator of the object to be measured is formed as a separator sheet specimen, and has a structure in which no separate inorganic layer is formed on both sides of the separator sheet specimen, and
    an another separator of the another electrochemical device has a structure including an inorganic layer formed on one or both sides of an another separator sheet specimen.

6. The method of claim 1, wherein the upper and lower jigs fix the state in which the object to be measured and the electrochemical device face each other.

7. The method of claim 1, wherein the upper and lower jigs pressurize the state in which the object to be measured and the electrochemical device face each other.

8. The method of claim 1, wherein the upper and lower jigs heat any one or more of the object to be measured and the electrochemical device while the evaluation is in progress.

9. The method of claim 1, wherein the separator is a separator for lithium secondary batteries.

10. A system for evaluating insulation and lithium ion conductivity characteristics of a separator for an electrochemical device, comprising:
   jig units configured to fix or press an object to be measured;
   an electrochemical device configured to repeatedly perform charging and discharging while located between the jig units;
   the object to be measured configured to be positioned in a state facing the electrochemical device between the jig units; and
   a measuring unit configured to measure an electrical resistance of the object to be measured.

11. The method of claim 10, wherein the object to be measured includes:
   an electrode assembly including a positive electrode, a negative electrode, and a separator interposed between the positive electrode and the negative electrode; and
   a pouch-type battery case in which the electrode assembly is accommodated.

12. The system of claim 10, wherein at least one of the upper and lower jigs has a structure on which a heating member is mounted.

13. The system of claim 10, further comprising: a recording unit configured to record an electrical resistance value through the measuring unit while the evaluation is in progress.

14. The system of claim 13, wherein the jig unit further includes at least one of a temperature sensor configured to measure a temperature of the object to be measured and a pressure sensor configured to measure a pressure of the object to be measured, and
   wherein the recording unit records the electrical resistance value through the measuring unit and a value measured through one or more of a temperature sensor and a pressure sensor for measuring a pressure of the object to be measured, while the evaluation is in progress.

15. The system of claim 10, wherein the jig unit further includes any one or more of a temperature sensor configured to measure a temperature of the object to be measured and a pressure sensor configured to measure a pressure of the object to be measured.

* * * * *